United States Patent
Wallner et al.

(10) Patent No.: US 11,460,288 B2
(45) Date of Patent: Oct. 4, 2022

(54) TRAIN CONTROL NETWORK, METHOD FOR COMMUNICATION AND METHOD FOR CONTROLLING TRAIN INTEGRITY

(71) Applicant: Thales Management & Services Deutschland GmbH, Ditzingen (DE)

(72) Inventors: Christian Wallner, Weil der Stadt (DE); Volker Morneweg, Eberdingen (DE); Gemma-Maria Salazar Luque, Alcorcon (ES)

(73) Assignee: Thales Management & Services Deutschland GmbH, Ditzingen (DE)

( * ) Notice: Subject to any disclaimer, the term of this patent is extended or adjusted under 35 U.S.C. 154(b) by 133 days.

(21) Appl. No.: 16/892,797

(22) Filed: Jun. 4, 2020

(65) Prior Publication Data
US 2020/0300600 A1    Sep. 24, 2020

Related U.S. Application Data

(63) Continuation of application No. PCT/EP2018/083672, filed on Dec. 5, 2018.

(30) Foreign Application Priority Data

Dec. 8, 2017 (EP) .................................. 17206245

(51) Int. Cl.
*G01N 27/00* (2006.01)
*G01B 7/14* (2006.01)
(Continued)

(52) U.S. Cl.
CPC ................. *G01B 7/14* (2013.01); *H04B 3/60* (2013.01); *B61L 3/246* (2013.01); *B61L 15/0054* (2013.01); *B61L 27/70* (2022.01); *B61L 2205/04* (2013.01)

(58) Field of Classification Search
CPC ........ G01N 15/12; G01N 17/02; G01N 27/60; G01N 15/1227; G01N 15/1218;
(Continued)

(56) References Cited

U.S. PATENT DOCUMENTS

2003/0010872 A1* 1/2003 Lewin .................. B61L 25/025
246/122 R
2010/0093897 A1* 4/2010 Benage ..................... C08F 2/40
524/87
(Continued)

FOREIGN PATENT DOCUMENTS

DE    31 24 884 A1    3/1982
DE    196 28 124 A1    1/1998
(Continued)

OTHER PUBLICATIONS

Linienzugbeeinflussung, Wikipedia, https://en.wikipedia.org/wiki/Linienzugbeeinflussung.
(Continued)

*Primary Examiner* — Raul J Rios Russo
(74) *Attorney, Agent, or Firm* — Hackler Daghighian Martino & Novak

(57) ABSTRACT

A train control network includes a rail, a first communication element and a second communication element, which are to communicate with each other. The first communication element includes a first HF-injector, adapted for injecting HF-signals into the rail. The second communication element includes a HF-receiver, adapted for receiving HF-signals transmitted via the rail. An evaluation unit is provided for analyzing the received HF-signals.

15 Claims, 3 Drawing Sheets

(51) Int. Cl.
*H04B 3/60* (2006.01)
*B61L 27/70* (2022.01)
*B61L 15/00* (2006.01)
*B61L 3/24* (2006.01)

(58) Field of Classification Search
CPC .. G01N 17/00; G01B 7/14; H04B 3/60; B61L 27/70; B61L 2205/04; B61L 15/0054; B61L 3/246
USPC .................................. 324/71.1–71.6
See application file for complete search history.

(56) References Cited

U.S. PATENT DOCUMENTS

| | | |
|---|---|---|
| 2014/0014784 A1 | 1/2014 | Brown |
| 2014/0277859 A1 | 9/2014 | Morris |
| 2015/0175180 A1* | 6/2015 | Szprynger ............... B61L 3/125 701/2 |
| 2015/0344048 A1 | 12/2015 | Kernwein |
| 2016/0359741 A1* | 12/2016 | Cooper ................... H04W 4/44 |
| 2021/0122688 A1* | 4/2021 | Dorsi ...................... C07C 29/48 |
| 2021/0179513 A1* | 6/2021 | Joly ........................ B01D 3/143 |

FOREIGN PATENT DOCUMENTS

| | | |
|---|---|---|
| EP | 0 513 129 B1 | 9/1996 |
| EP | 2 450 250 A1 | 5/2012 |
| EP | 3 228 519 A1 | 11/2017 |
| WO | 01/62572 A1 | 8/2001 |
| WO | 2013162472 A1 | 10/2013 |

OTHER PUBLICATIONS

Zugbeeinflussung, Wikipedia, https://web.archive.org/web/20170809035905/https://de.wikipedia.org/wiki/Zugbeeinflussung.
Signaltechnische Sicherheit, https://web.archive.org/web/20151125083938/https://de.wikipedia.org/wiki/Signaltechnische_Sicherheit.

* cited by examiner

TRAIN CONTROL NETWORK, METHOD FOR COMMUNICATION AND METHOD FOR CONTROLLING TRAIN INTEGRITY

CROSS-REFERENCE TO RELATED APPLICATIONS

This continuation application claims priority to PCT/EP2018/083672 filed on Dec. 5, 2018 which has published as WO 2019/110673 A1 and also the European patent application No. 17 206 245.7 filed on Dec. 8, 2017, the entire contents of which are fully incorporated herein with these references.

DESCRIPTION

Field of the Invention

The invention concerns a train control network comprising a first communication element and a second communication element, which are to communicate with each other.

Background of the Invention

A train control network is known from [1].

In order to ensure safety during railway operation different railway elements have to communicate with each other. The LZB control center for example communicates with trains via conductor cable loops [1]. To do this, the railway track has to be equipped with conductor cable loops which is involved with considerable expense. Further, since the conductor loops are located outside they are exposed to weather and thus prone to damaging.

Communication between railway elements is also required for controlling train integrity. In order to determine the actual train length it is known to provide a head-of-train device in the railcar and an end-of-train device in the last wagon of a train which communicate with each other via Ethernet, radio communication or cable [2]. Yet, with the known methods train integrity can only be determined reliably at straight lines, since the distance between head-of-train device and end-of-train device does not comply with the train length if the train is in a curve.

SUMMARY OF THE INVENTION

Object of the Invention

It is an object of the invention to provide a train control network, a method for communication and method for controlling train integrity by using the method for communication, which allow reliable information transmission with less expenses.

DESCRIPTION OF THE INVENTION

This object is solved by a train control network according to claim 1, a method for communication according to claim 9 and a method for controlling train integrity according to claim 12.

According to the invention the first communication element comprises a HF-injector, adapted for injecting HF-signals into the rail, and the second communication element comprises a HF-receiver, adapted for receiving HF-signals transmitted via the rail; an evaluation unit is provided for analyzing the received HF-Signals.

According to the invention the rail is used as a transmission medium for transmission of HF-signals between the communication elements. The transmission function via an electromagnetic field which is generated around the rail by means of the HF-injector. I.e the HF-injector is adapted to generate an electromagnetic field around the rail. By means of the inventive signal transmission continuous communication between the communication elements (e.g. trains, field elements etc.) is enabled without installation of additional transmission elements in the field. No data bus is required. The inventive train control network therefore provides a cost-effective communication system. In addition, a low-loss continuous communication can be realized due to the signal transmission by means of HF-signals.

The HF-receiver transmits the HF-signals to the evaluation unit for analysis. The evaluation unit is preferably provided with the second communication element, in particular positioned within the second communication element. The evaluation unit may for example be a subsystem of an ETCS on-board. Yet, it is also possible to use a remote central evaluation unit to which the received HF-signal or data derived from the received HF-signal are transferred.

Preferably the frequency of the HF-signals is >1 kHz, in particular >1 MHz. Most preferred is the injection of GHz-signals. By providing a high frequency (>1 kHz) of the HF-signals, the losses during transmission can be reduced.

The injected HF-signal comprises an ID for identifying the communication element to which the HF-injector is assigned (connected to).

In a preferred embodiment the network further comprises a train integrity module for determining train integrity, i.e. the network comprise components (HF-injector, HF-receiver, rail, time basis, evaluator) which interact and are adapted for determining train integrity.

In a highly preferred embodiment the HF-signal is a time signal and the train control network comprises a time basis device adapted for providing a common time basis for the HF-receiver and the HF-injector. By using a common time basis the runtime of the HF-signals within the rail can be determined. A "time signal" according to the invention is a signal which comprises information about the time, at which the signal has been injected in the rail (timestamp). The time basis device can be e.g. a GPS receiver which is in communication with both, the HF-receiver as well as the HF-injector, or clocks which are synchronized with one another.

In a highly preferred embodiment the HF-injector is adapted for contact-free injection of HF-signals into the rail, in particular for injection via induction or infra sound, and/or the HF-receiver is adapted for contact-free reception of HF-signals from the rail, in particular for reception via induction or infra sound. Contact free injection allows injection of HF-signals without abrasion of contact elements.

The communication elements are preferably selected from: field element (in particular element controller of a field element), train, wagon, point, control center.

In a highly preferred embodiment the HF-receiver and the HF-injector are mounted on a train. In this case the communication elements can be wagons of the train. The expression "on a train" means "in" or "at" a train, in particular in vicinity of the rail, e.g. under the train.

In a special embodiment the second communication element is a railcar of a train and the first communication element is the last wagon of a train.

The invention also concerns a method for communication between a first communication element and a second communication element within a train control network according to one of the preceding claims, wherein a HF-signal is injected into the rail by means of the HF-injector of the first communication element, the injected signal is transmitted via the rail and is received by means of the HF-receiver of the second communication element.

It is preferred that the injection and reception are carried out contact-less, in particular via inductive coupling or infra sound.

In order to provide data to the communication elements the HF-signal is electromagnetically modulated.

In a preferred variant an unequivocal identification of the first communication element is transmitted with the HF-signal. For example if the two communication elements are trains, the leading train may sends a HF-signal including a train identifier to the following train. By evaluating the runtime of the HF-signal the following train recognizes the position of the preceding train.

The aforementioned method can be advantageously used for controlling train integrity. Therefore, the invention also concerns a method for controlling train integrity by using the aforementioned method, wherein the second communication element is a railcar of a train and the first communication element is the last wagon of a train, the method comprising the following steps:

during an operation mode of the first communication element: continuously injection of HF-signals to the rail, in particular periodically, wherein the HF-signals are time signals;

analyzing the received HF-signals and determining a train length;

checking whether the determined train length complies with a target length, in particular the expected length of the train.

The target length is the expected length of the train.

The inventive method allows a safe and direct detection of the relative position of the railcar and the last wagon on the track and/or the distance of the railcar and/or the last wagon to communication elements (e.g. field elements) The detection of the relative position can be carried out e.g. by means of kilometer mileage.

The inventive method allows easy and precise detection of the train length. Blocked wheels and lacking GPS-reception (e.g. in tunnels) are no problem if the inventive method is used. Thus a high level of safety can be realized (SIL4).

Preferably the received HF-signals are analyzed by means of an on-board unit (evaluation unit which is installed on board of a train), in particular of an ETCS on-board unit. Thus by means of the inventive method the on-board unit can be provided with safe information concerning train integrity.

In a preferred variant the HF-signals are analyzed by determining a runtime of the HF-signals and using the runtime for determining of the train length. Since the HF-signals are transmitted via the rail the real length of the train can be reliably determined (independently whether the train is located in a curve, in a tunnel or elsewhere) by using the runtime of the HF-signals.

The HF-signals are preferably analyzed by comparing the received HF-signal with a time information of the HF-receiver. Thus, the runtime of the HF-signal can be determined. The same time basis is required for the HF-receiver and the HF-injector.

In case the determined train length does not comply with the target length, it is preferred that a control center is informed and/or an intervention in the operating process is carried out. An intervention can comprise e.g. an emergency brake.

DETAILED DESCRIPTION OF THE PREFERRED EMBODIMENTS

Figure 1:
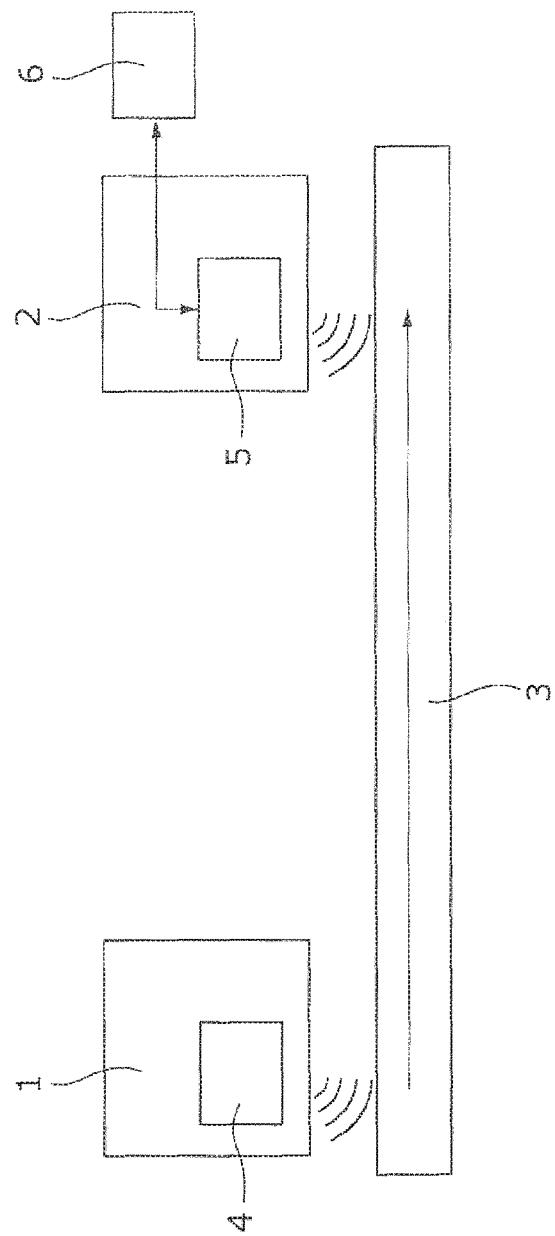
FIG. 1 shows an inventive train control network.

FIG. 1 shows an inventive train control network with a first communication element 1 and a second communication element 2 which are in contact or located close to a rail 3 for rail bound vehicles. The first communication element 1 comprises a first HF-injector 4 for injecting an HF-signal into the rail 3. For this purpose the first HF-injector 4 is located near the rail 3 (in particular less than 10 cm). The HF-signal is transferred via rail 3 to the second communication element 2. The second communication element 2 comprises an HF-receiver 5 which detects the HF-signal. According to the invention rail 3 serves not only for guiding a rail bound vehicle but also for transmission of HF-signals. The injection and reception of the HF-signal into/from the rail 3 is preferably carried out contactless as shown in the figures, e.g. via inductive coupling. The inventive train control network further comprises an evaluation unit 6 for evaluating the HF-signal received by the HF-receiver 5. For this purpose HF-receiver 5 transmits the received HF-signal to evaluation unit 6, which is adapted to receive HF-signals from the HF-receiver 5. The HF-receiver 5 and the evaluation unit are electrically connected each other.

Figure 2:
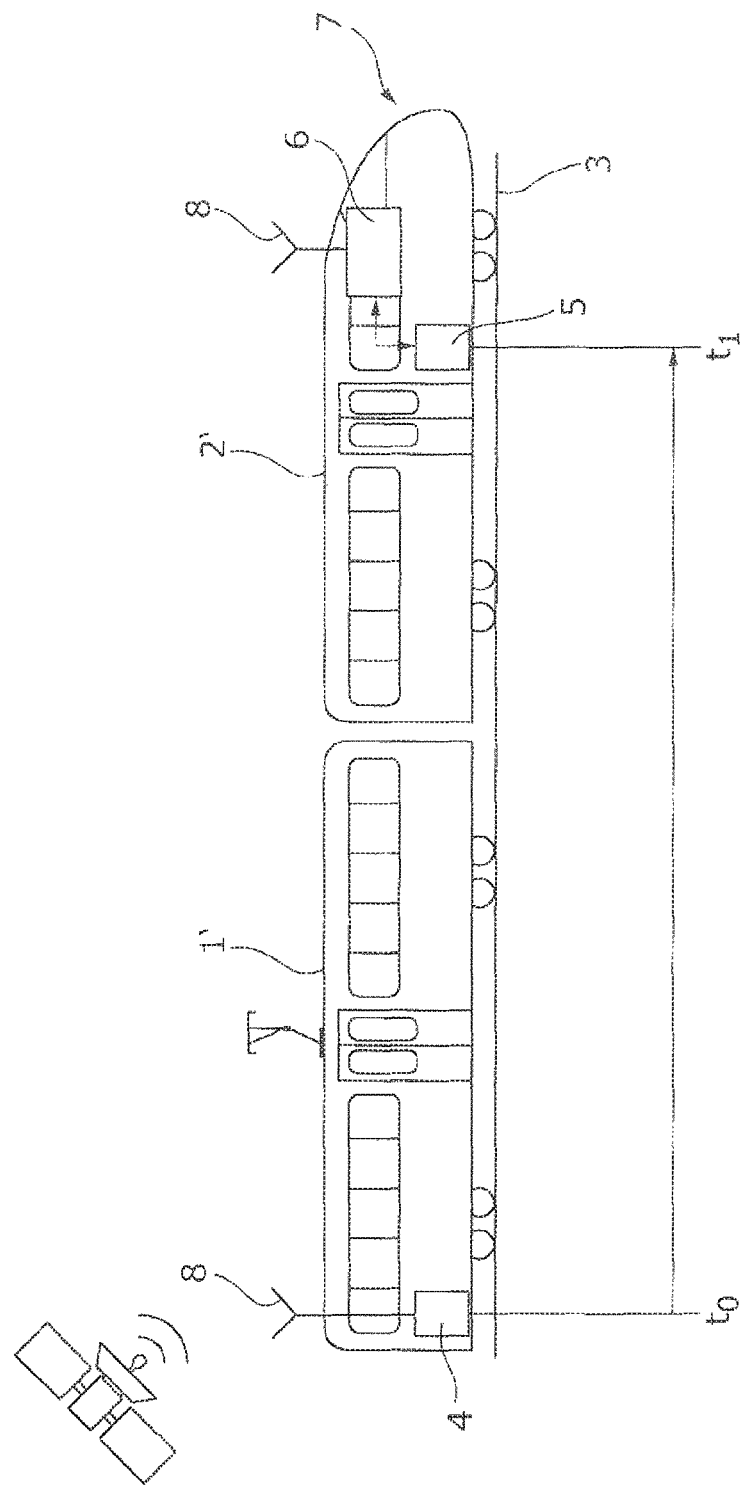
FIG. 2 shows a preferred embodiment of the inventive train control network for train integrity control.

FIG. 2 shows a highly preferred embodiment of the inventive train control network which can be used for controlling train integrity. The first communication element 1' (here: last wagon 1' of a train 7) is equipped with the first HF-injector 4 which is preferably positioned at the bottom of the wagon 1' for coupling HF-signals into the rail 3. In order to control train integrity the HF-signals injected into the rail 3 are time signals, i.e. signals which contain information concerning the time at which the HF-signal has been injected into the rail 3. The HF-signals are transferred through the rail 3 to the railcar (second communication element 2'), are received by the HF-receiver 5 and transferred to the evaluation unit 6. In the embodiment shown in FIG. 2 the evaluation unit 6 (e.g. an on board unit of an ETCS) is located within the railcar 2. The received HF-signal can thus be evaluated directly within the railcar 2.

For controlling train integrity the length of the train 7 has to be determined. According to the invention this is done by evaluating the HF-signal-runtime within the rail 3 between first HF-injector 4 and HF-transceiver 5. For this purpose the evaluation unit 6 and the first HF-injector 4 use the same time basis, which is provided by a time basis device 8. To achieve the required accuracy, e.g. GPS can be used for providing the required time basis. The injected HF-signal comprises a time information (injection time $t_0$) which can be read by the evaluation unit 6. The evaluation unit 6 evaluates the runtime by determining the difference of the injection time $t_0$ and the reception time $t_1$. Thus the length L of the train can be determined: $L = v \cdot (t_1 - t_0)$ (v is the propagation speed of the HF-signal within the rail 3).

Figure 3:
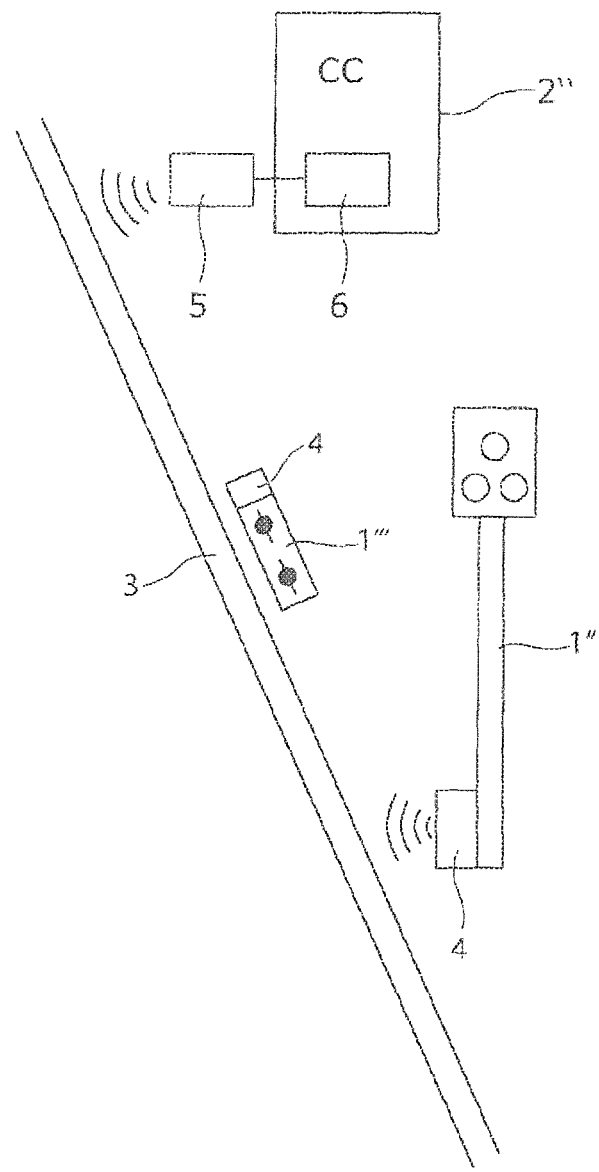
FIG. 3 shows another embodiment of the inventive train control network for communication between a signal and a control center.

The inventive train control network can also be used for transmitting information between field elements or between an field element 1", 1'" and a control center 2" which is located near the rail 3, as shown in FIG. 3.

In FIG. 3 a railway signal 1" and an axle counter 1'" (first communication elements) send HF-signals, (e.g. with information concerning switch state, information about occupied blocks) via rail 3 to the HF-receiver of the control center 2". In the shown example the HF-receiver 5 of the control center is located outside the housing of the control center 2" but is electrically connected with the control center 2".

The inventive train control network also allows communication between control center 2 and train 7 via the rail 3 (not shown). E.g. control center 2" may send telegrams to the train 7. The telegram may comprise information e.g. concerning movement authority of the train 7. The train 7 may send HF-signals comprising information indicating its configuration, braking capabilities, speed, position etc. to control center 2". In this case both, train 7 and control center 2", act as first communication element as well as second communication element and thus have to be equipped with HF-injector and HF-receiver. Alternatively an HF-transceiver can be installed.

The present invention suggests using a rail of a railway network for communication between communication elements within said railway network, in particular for determining train integrity. Conductor cables for signal transmission and continuous connection to location detection devices (e.g. GPS) can be dispensed.

LIST OF REFERENCES SIGNS

1 first communication element
1' first communication element—wagon of a train
1" first communication element—railway signal
1'" first communication element—axle counter
2 second communication element
2' second communication element—rail car
2" second communication element—control center
3 rail
4 HF-injector
5 HF-receiver
6 evaluation unit
7 train
8 time basis device Cited references, the contents of which are fully incorporated herein with these references:
[1] https://en.wikipedia.org/wiki/Linienzugbeeinflussung
[2] DE 16 163 692.3 (not published)

What is claimed is:

1. A train control network, comprising:
a rail, a first communication element and a second communication element, which are to communicate with each other;
wherein the first communication element comprises or is connected to a first HF-injector, adapted for injecting HF-signals into the rail;
wherein the second communication element comprises or is connected to a second HF-receiver, adapted for receiving HF-signals transmitted via the rail;
wherein an evaluation unit is mounted on a train and is provided for analyzing the received HF-signals;
wherein a frequency of the HF-signals is >1 MHz;
wherein the first HF-injector is mounted on the train at one end and the second HF-receiver is mounted on the train at an opposite end; and
wherein the evaluation unit is configured to evaluate a length of the train by evaluating a runtime of the HF-signal from the first HF-injector to the second HF-receiver using a common time basis.

2. The train control network according to claim 1, wherein the network further comprises a train integrity module for determining train integrity.

3. The train control network according to claim 1, wherein the first HF-injector is adapted for contact-free injection of HF-signals into the rail via induction or infra sound, and/or that the second HF-receiver is adapted for contact-free reception of HF-signals from the rail via induction or infra sound.

4. The train control network according claim 1, wherein the communication elements are selected from: field element, train, wagon, control center.

5. The train control network according to claim 1, wherein the second communication element is a railcar of the train and the first communication element is the last wagon of the train.

6. A method for communication between the first communication element and the second communication element within the train control network according to claim 1, wherein the HF-signal is injected, by being induced, into the rail by means of the first HF-injector of the first communication element, wherein the injected HF-signal is transmitted via the rail and is received by means of the second HF-receiver of the second communication element.

7. The method according to claim 6, wherein the injection and reception are carried out contact-less via inductive coupling.

8. The method according to claim 7, wherein the HF-signal is electromagnetically modulated.

9. The method according to claim 8, wherein an unequivocal identification of the first communication element is transmitted with the HF-signal.

10. A method for controlling train integrity by using the method according to claim 6, wherein the second communication element is a railcar of the train and the first communication element is the last wagon of the train, the method comprising the following steps:
 a. during an operation mode of the first communication element: continuously injection of HF-signals to the rail, wherein the HF-signals are time signals;
 b. analyzing the received HF-signals and determining the train length;
 c. checking whether the determined train length complies with a target length.

11. The method according to claim 10, wherein the HF-signals are injected periodically.

12. The method according to claim 10, wherein the received HF-signals are analyzed by means of an on-board unit being an ETCS on-board unit.

13. The method according to claim 10, wherein the HF-signals are analyzed by determining the runtime of the HF-signals and using the runtime for determining of the train length.

14. The method according to claim 13, wherein the HF-signals are analyzed by comparing the received HF-signal with a time information of the second HF-receiver.

15. The method according to claim 10, wherein in case the determined train length does not comply with the target length, a control center is informed and/or an intervention in the operating process is carried out.

* * * * *